Jan. 15, 1963  D. HALE  3,073,955
GAMMA RADIATION DOSIMETER
Filed April 26, 1960  4 Sheets-Sheet 1
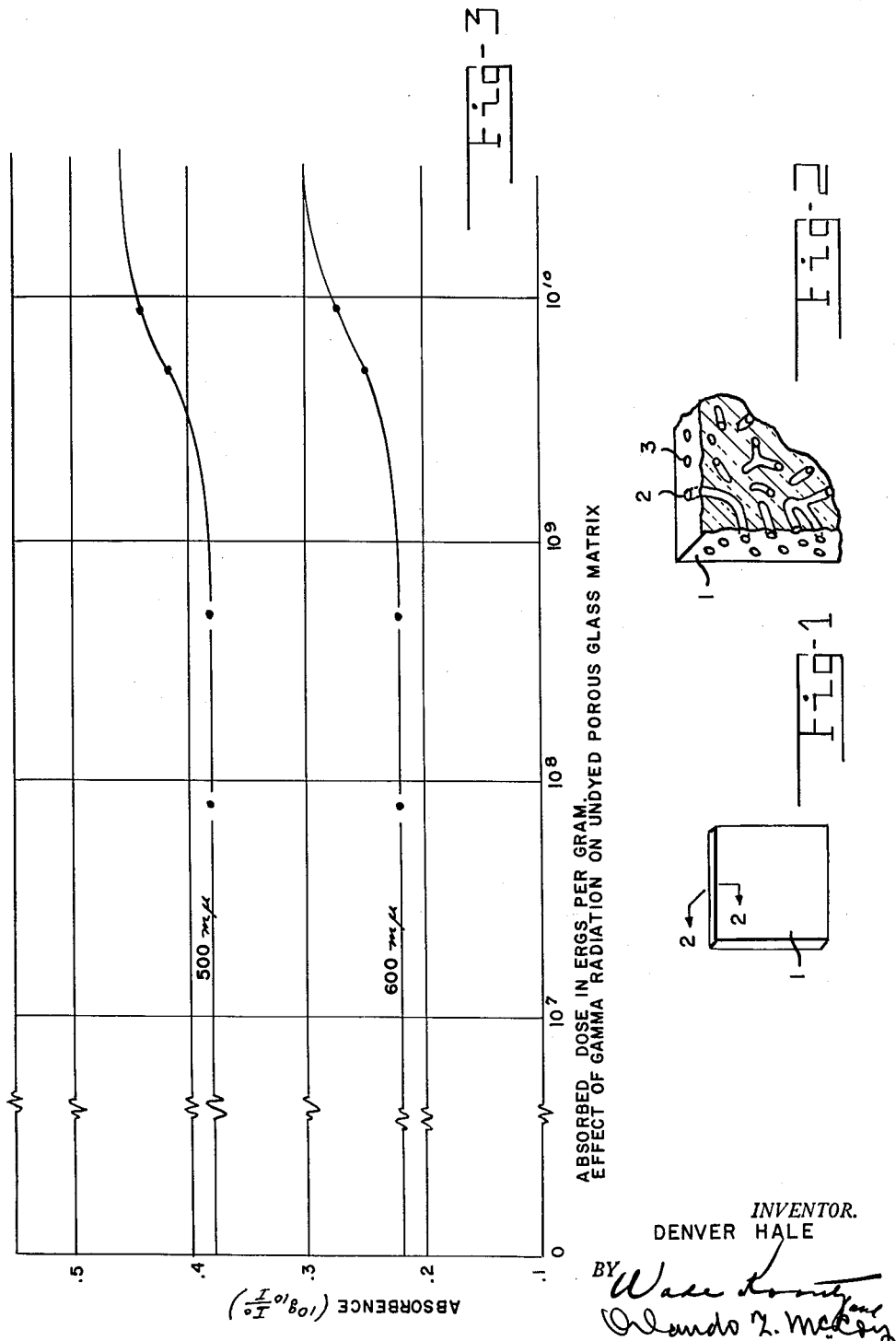
INVENTOR.
DENVER HALE
BY
ATTORNEYS

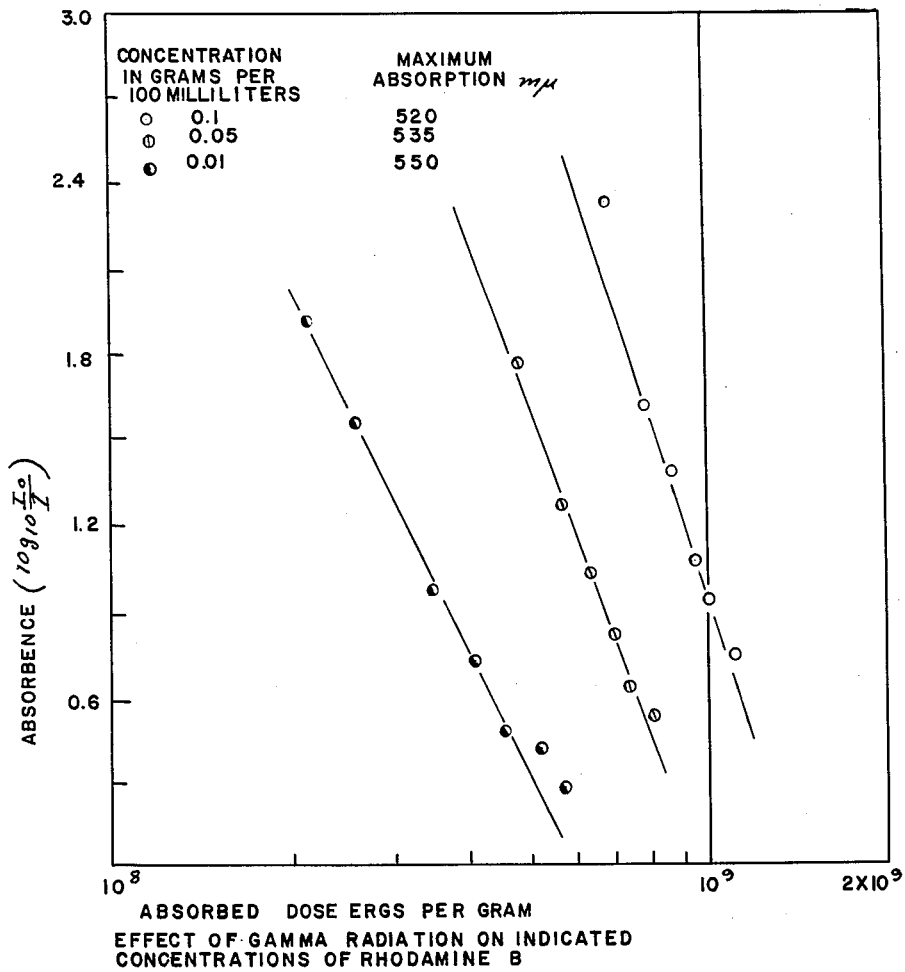

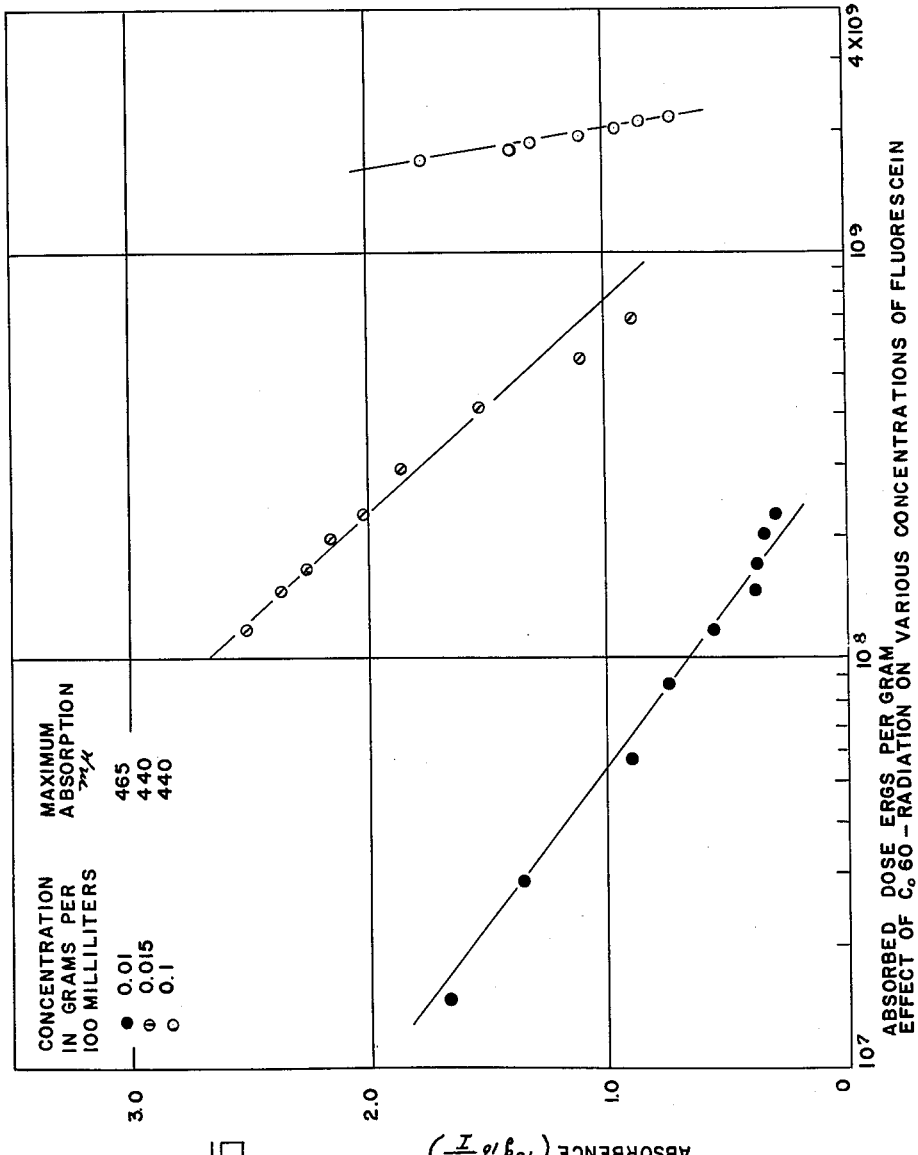

3,073,955
GAMMA RADIATION DOSIMETER
Denver Hale, 1621 Philadelphia Drive, Dayton, Ohio
Filed Apr. 26, 1960, Ser. No. 24,858
4 Claims. (Cl. 250—83)
(Granted under Title 35, U.S. Code (1952), sec. 266)

The invention that is described herein may be manufactured and used by or for the Government for governmental purposes without the payment to me of any royalty thereon.

This invention concerns gamma radiation dosimetry and more particularly it pertains to an improved, simplified and small size colorimetric dosimeter for use in the range of from $10^7$ to $10^9$ ergs per gram and to a unique method of measuring ionizing-radiation by the destruction of organic dyes absorbed in a porous matrix body. When one of the dyes is subjected to X-ray or to gamma irradiation, a change in the visual absorption spectra is observed as a change from color to colorless. The change may be observed visually or it may be registered on a colorimetric instrument such as a spectrophotometer or the like.

A past practice in chemical dosimetry has been to formulate a system with water or organic solvents in which a desired organic dye was dissolved. A dye was also built into a film. Irradiation of the systems by gamma rays degrades both the solvents, the film and the dyes and thereby causes uncertainty of analysis and errors in the quantitative measurements of the magnitude of a gamma radiation to which the system was exposed.

In solid state dosimetry systems, and particularly where glass is used, an important disadvantage that is encountered within the useful range of the system is the fading of the radiation induced color centers in the glass with time and temperature. Precision in readings obtained requires a minimum of lapsed time and a fixed temperature.

Radiation Dosimetry by Gerald U. Hine and Gordon L. Brownell and copyrighted in 1956 by the Academic Press, Inc., New York 10, New York, discusses gamma-ray instruments and dosimeters quite extensively. The absorption of radiation dosages by persons working with radioisotopes that emit beta and gamma rays has become increasingly important as knowledge increases of the effect of these rays on the human anatomy. An awareness of these effects has been apparent and increasingly appreciated since radium entered the medical field. The International Commission on Radiological Units defined as the intensity of radiation the energy flowing through unit area perpendicular to the beam per unit of time expressed in ergs per square centimeter per second. The term absorbed dose is expressed in rads and is 100 ergs per gram. The roentgen is the unit of X- and gamma ray dosage up to quantum energies of 3 mev. or $3 \times 1.602 \times 10^{-6}$ ergs. 1 rad is $6.24 \times 10^7$ mev. per gram. 1 mev. is one million electron volts. 1 erg is the energy expended when a force of one dyne acts through a distance of one centimeter.

Van Norstrand's Scientific Encyclopedia, Third Edition, published in 1958 by D. Van Nostrand Company, Inc., New York city, New York, defines absorbency as being the common logarithm of the reciprocal of the transmittancy as the ratio of transmittance of a solution to that of the pure solvent in equivalent thickness.

The Measurement of Color by W. D. Wright, published in 1958 by The MacMillan Company, New York city, New York, at pages 10 to 14 and elsewhere, discusses Beer's law and with respect to the absorption of a medium as the density D defined as $$\log 10 \frac{F_0}{F}$$

and on page 13 transmission is defined as $$\frac{F}{F_0}$$

where F is light flux. In Beer's law I is intensity of light.

The problem encountered by workers with X-ray and gamma ray emitting equipment is their concern over the health hazard that may result from their exposure in the sterilization and pasteurization of foods, drugs and the like, in the synthesis of new compounds, etc.

Many systems have been proposed and investigated for high level dosimetry. Most of the systems require careful analytical chemical techniques for dosage determinations with desirable accuracy. The most satisfactory routine chemical dosimetry determinations result from the processes using the ferrous-ferric oxidation reaction and the ceric-cerous reduction reaction. X-rays and gamma rays have been measured by silver and by cobalt activated glass based on increased optical absorption resulting from exposure. The chief objection to prior determinations has been the fading of the absorption bands over a period of time at laboratory temperatures of around 20° C. and the complete discharge of color at short time heating at from 400° C. to 500° C.

An object of this invention is the provision of a compact dosimeter for indicating ionizing radiation that is not dependent upon molecular or ionic species produced in a solvent or upon the development of color centers in glass.

Another object is to provide a small, dependable colorimetric indicator that may be conveniently carried in pockets, hand bags and the like and that provides a positive reaction on exposure to nuclear radiation above a threshold value.

A further object is the provision of a cellular matrix of highly porous silica as a carrier for selected dyes that are absorbed and retained by the porous matrix. The dyes are responsive to radiation. The character and the magnitude of the dye absorbance of the radiation is readily apparent for both visual observation and instrument detection.

This invention relates to a unique apparatus and method of measuring ionizing-radiation by its effect on organic dyes that are absorbed by a porous glass matrix.

This invention is a dosimeter that consists of a cellular matrix body that is saturated with a dehydrated dye that is destroyed by gamma radiation, such that the difference in dosage reading between the matrix and the dye indicates the dosage magnitude required to destroy the dye. The present invention includes the described methods of making and using the dosimeter. The units used herein conform with those defined at page 10 and elsewhere in the Hine and Brownell text previously cited.

In the accompanying drawings:

FIG. 1 is a perspective view of a rectangular dosimeter that embodies the present invention;

FIG. 2 is an enlarged fragmentary section of a corner taken from about the line 2—2 of FIG. 1;

FIG. 3 is a graph of absorbed dosages plotted against absorbance of the undyed porous glass matrix;

FIG. 5 is a graph of the effect of gamma radiation on the dye rhodamine B; and

FIG. 6 is a graph of the effect of gamma radiation on the dye fluorescein.

Figure 4:
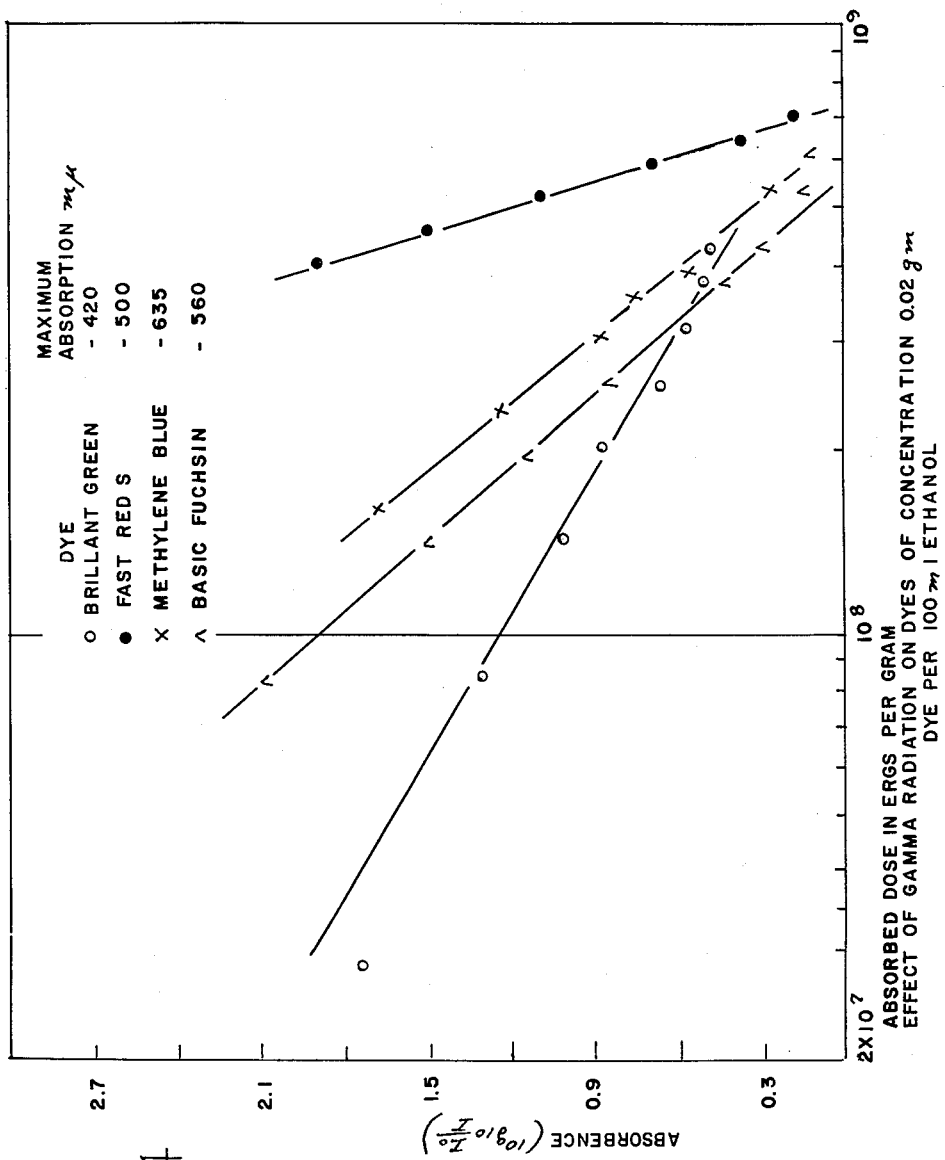
FIG. 4 is a graph of dosages plotted against absorbance for a plurality of colorimetric indicators or dyes.

The dosimeter illustrated in the accompanying drawings comprises a cellular matrix 1 of an absorbent material that is chemically inert to and that is colorimetrically substantially unchanged by gamma radiation about over the range of intensities $10^7$ to $10^9$ ergs per gram.

In FIGS. 1 and 2 of the accompanying drawings, is shown a porous cellular matrix 1 of $SiO_2$ that is interlaced by channels 2, voids 3 and the like.

The reduction to practice of this invention was accomplished with a cellular structure matrix of $SiO_2$ made from glass.

In FIG. 3 is shown a graph of absorbence of the clean, dry, porous cellular glass matrix with the absorbance ratio of energy impinging on the matrix over energy that passes through the matrix along the ordinate against gamma radiation dose in ergs per gram applied to the matrix along the abscissa. Values are plotted at the light wavelengths of 500 mu and 600 mu. It will be noted that for both of these transmitted light frequencies the light absorbance is essentially unchanged for dosages from zero to $10^9$ ergs per gram. The absorbance is expressed as the $$\log 10 \frac{I_0}{I_1}$$

in conformance with Beer's law. The effect of the gamma radiation is expressed in terms of absorbed dose in ergs per gram.

FIG. 4 is a graph of points obtained from the spectrophotometer using four matrices, each of which contains a different dye at one concentration.

In FIG. 5 the dye rhodamine B in a matrix has experimentally provided points for different concentrations of dye as disclosed at the top of the chart.

In FIG. 6 the fluoroscein in a matrix has provided points for different concentrations of the same dye as indicated at the top of the chart.

Typical working curves in the FIGS. 4, 5 and 6 of the drawings, are constructed from experimental data derived from the charts made by the spectrophotometer. In each determination of FIGS. 4, 5 and 6 the absorbance of a clean, dry matrix through which the light beam of the spectrophotometer passed before it passed through the dye loaded matrix deducted the matrix reading from the dye reading.

In plotting the curves the maximum light absorption values of the dye were used. The concentrations of the dyes at the absorption peaks that remain after each exposure to gamma radiation for increasing periods of time are plotted against the dose after each radiation exposure. After each radiation exposure, the data points are connected by a continuous line for that one series of determinations. This procedure is repeated for each of the determinations and for each of the dyes reported herein. At the completion of the dye degradation the curves depart from a linear relation.

The glass of the matrix may be heat treated at 600° C. for two hours and then cooled. The porous glass matrix used in this invention is produced by leaching the borosilicate glass that is used in the manufacture of 96 percent silica glass with strong mineral acids, such as $H_2SO_4$, HCl and the like. The glass matrix is very porous and contains voids that are interconnected by channels and that amount to about 28 percent of the total volume of the matrix. The developed surface area is in the order of 200 square meters per gram of glass. The matrix is a three-dimensional body with strong surface forces for the adsorption of liquids. It has a dry density of 1.45, and is slightly opalescent in color.

The soluble sodium, potassium, boron, etc., content of the glass may then be removed from the $SiO_2$ by being leached out with selections of mineral acids such as 3 to 5 normal sulfuric, hydrochloric and nitric acids at an elevated temperature of about 100° C. within an autoclave for a time of linearly increasing duration with increasing thickness of the glass, such as a week for glass that is 7 mm. in thickness. The resultant matrix is a cellular structure of $SiO_2$ that is termed herein "thirsty glass," because it presents a usable void space of about 28 percent of its volume and is colorimetrically substantially unchanged by its exposure to gamma radiation over a range up to about $10^{10}$ ergs per gram.

The dosimeter matrix is charged by preparing a solution of a dye selected illustratively from the group that consists of the commercially available dyes; methylene blue or methylthionine chloride; basic fuchsine or a mixture about equal parts of rosaniline and pararosaniline; fluorescein or resorcinol phthalein; rhodamine B or tetraethyl rhodamine chloride; fast red S or the monosodium salt of 4-(2-hydroxy-1-naphthylazo)-1-naphthalene sulfonic acid; brilliant green or bis-(p-diethylamino phenyl)-phenylmethane-monohydrogen sulfate; and the like. These dyes are representative members from the chemical groups of the thiazines, the xanthenes, triphenyl methanes, chlorinated rosanilines, etc.

The methylthionine chloride has the structural formula

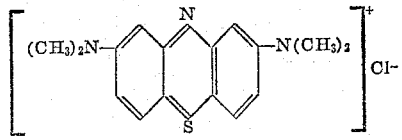

and is available commercially as methylene blue and as methylthionine chloride and has the emperical formula $C_{16}H_{18}ClN_3S \cdot 3H_2O$.

The basic fuchsine has the structural formula as rosaniline

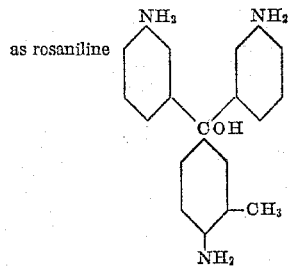

and the pararosaniline form is

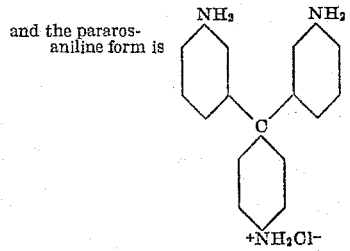

when rosaniline is treated with HCl and has the empirical formula $C_{20}H_{20}N_3Cl$.

The resorcinol phthalein or fluorescein has the structural formula:

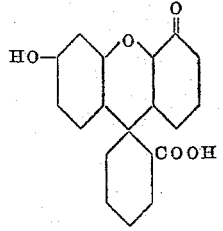

the empirical formula $C_{20}H_{12}O_5$ and is a red color at 20° C. and 1 atmosphere pressure.

The tetraethylrhodamine chloride has the structural formula:

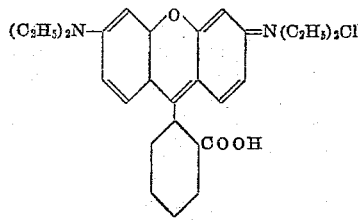

the empirical formula $C_{28}H_{31}ClN_2O_3$ and is available in the trade as rhodamine B and tetraethylrhodamine chloride and is red at 20° C. and 1 atmosphere pressure.

The monosodium salt of 4-(-2-hydroxy-1-naphthylazo)-1-naphthalene sulfonic acid has the structural formula:

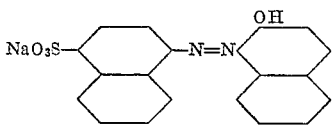

the empirical formula $C_{20}H_{13}N_2NaO_4$ and is available in trade as fast red S, as Azo, as acid red and as CI88. It has a red color at 20° C. and 1 atmosphere pressure.

The brilliant green dye has the structural formula:

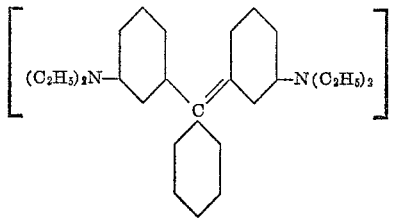

$SO_4H$ of bis(p-diethylamine-phenyl)-phenylmethane-monohydrogen sulfate. It has the empirical formula $C_{27}H_{34}N_2O_4S$ and is green at 20° C. and 1 atmosphere pressure.

The direct interaction of radiation with the above disclosed dyes for a sufficient length of time at 20° C. results in the decomposition of the dye and the loss of its color so that at 20° C. and 1 atmosphere pressure, it is substantially as colorless as water. The dosage test that is required to destroy all of the color of all of these dyes, other than methylene blue, is about $5 \times 10^8$ ergs per gram. Irradiations of methylene blue conducted in the presence of air results in an entirely irreversible loss of color. The radiation mechanism probably proceeds by the destruction of the conjugated bonds in the dye molecule. Because of the non-penetrating nature of ionizing radiation other than X-rays and gamma rays, the experimentation that results in the discoloration of the dyes here disclosed is in effect limited to X-radiation and to gamma radiation within the range of from $10^7$ to $10^9$ ergs per gram.

The radiation characteristics of the untreated cellular glass matrix for the dye-glass dosimeter that is contemplated hereby was accomplished under laboratory conditions of temperature 20° C. and a pressure of about one atmosphere by irradiating a matrix of the size 1 inch by 1 inch and 4 mm. thick in a cobalt 60 gamma source to a total dosage of up to $3 \times 10^{10}$ ergs per gram. A comparison of the absorption spectrum on the unirradiated and irradiated glass matrices from the wavelengths of from 320 mu to 700 mu displayed no absorption bands appearing at this dosage level. Results of this irradiation on the undyed glass indicated radiation stability at higher dosages. At a dose of $10^{10}$ ergs per gram there is a loss of only 10 percent in transmittance at the wavelength of 600 mu, as indicated in FIG. 3 of the drawings.

In the practice of the present invention, cellular glass matrices that are one inch square and 4 mm. thick are leached in distilled water at 20° C. and 1 atmosphere pressure for at least two hours and up to twenty-four hours for the complete removal of all occluded residual acid and until the leaching water is of pH 7. The leached cellular glass matrices are then exposed to moving dry air for two hours or more and are completely dehydrated in a desiccator containing anhydrous calcium chloride, silica gel, concentrated sulfuric acid or the like, by remaining in the desiccator overnight.

The completely dehydrated cellular glass matrix is then scanned in a spectrophotometer over the wavelength band from 320 mu to 700 mu to determine its total transmittance in the absence of any gamma sensitive material. The commercially available Cary recording spectrophotometer, model 12, or the Beckman Spectrophotometer, are adequate for this work. Where desired, the clean, dry matrix may be scanned simultaneously as a control with a test sample in separate light conducting channels.

A dye solution is then ready for use, as having been prepared, using one of the dye defined above, such as, for example, the methylene blue. An illustrative dye solution is prepared under laboratory conditions of pressure and temperature of about one atmosphere and 20° C. by measuring out in a clean, dry volumetric flask 100 ml. of ethanol and adding to the ethanol 20 milligrams of chemically pure methylene blue. The flask is rotated to uniformly distribute the methylene blue through the ethanol. The dye solution is poured into a clean dry beaker. The dehydrated cellular glass matrix is removed from the desiccator and is immediately completely immersed in the dye solution. The beaker containing the matrix immersed in the dye solution is permitted to stand for about two hours at 20° C. and one atmosphere of pressure. The ethanol in the dye solution may be denatured or may be replaced by other alcohols, ethers, esters, aromatic hydrocarbons, water, or the like, that are suitable and are chemically non-reactive with both the dye and the matrix.

At the end of the period of saturation of the cellular glass matrix with the dye solution, the matrix is removed from the dye solution, air dried and then is transferred to a desiccator where it is reduced to an anhydrous condition.

Spectrophotometers of the Cary and Beckman recording type produce charts that read transversely in opacity with 100 percent opacity at the bottom of the chart and linearly in wave lengths expressed in millimicrons. The charts record the visual range of the spectrum from approximately 320 millimicrons to 700 millimicrons in which the absorbance or transmittance is measured.

The spectrophotometer is started in its operation and the operation is continued for an ample time to pass beyond peak readings for subsequent runs. The clear matrix produces a rising curve that approaches asymptotically a linear relation along a minimum opacity. On the completion of the initial run, the clean matrix is removed from the spectrophotometer and is dehydrated in a desiccator.

The clean, dehydrated matrix is taken from the desiccator and is immediately completely immersed in a solution of 20 milligrams of a dye dissolved in ethanol and soaked in the solution until the matrix has an optimum charge of the dye solution, such as being soaked overnight or longer.

The dye charged matrix is removed from the ethanol solution of dye and is let stand in dry, dust-free air until the ethanol in the matrix is at a minimum, such as overnight. The dried dye-loaded matrix is then placed in a desiccator and left there overnight, or the like, until it is thoroughly dehydrated.

The dehydrated, dye-loaded matrix is removed from the desiccator and is placed at a fixed distance from an X-ray or a gamma ray source, as desired. Illustratively a dye-loaded matrix dimensioned one inch square and 4 mm. thick is suspended in a cobalt 60 pipe of 1¾ inch inside diameter for predetermined progressively increasing lengths of time with runs recorded on the spectrophotometer between each subsequent application of gamma radiation to the dye charged matrix. The increasingly longer periods of time may be, for example, ten hours, fifteen hours, twenty hours, twenty-five hours, thirty hours, etc.

Each run of the dehydrated dye-loaded matrix in the spectrophotometer is recorded as a curve. All of the curves are characterized by a peak that is progressively nearer the curve of the clean, dry matrix with increase in the time period the dye-loaded matrix is subjected to the dye decomposition by the gamma radiation.

The charts produced by the spectrophotometer are graduated in wave lengths in millimicrons longitudinally of the chart and relative opacity across the chart, such that the means produced over a described run occur within a narrow wavelength band.

The peak range indicates that the wave length becomes shorter as more dye is decomposed. The absorption peak shifts about 100 angstroms or 10 millimicrons to a shorter wavelength as the opacity is decreased with increasing dye destruction.

Data from the chart obtained from the spectrophotometer is then plotted on semi-log paper with gamma radiation dosages along the abscissa and the absorbance along the ordinate.

The dye-glass dosimeters that are contemplated hereby require no special handling techniques except that they are wrapped in aluminum foil during their irradiation.

The experimental results reported herein, as FIG. 3 of the drawings, on the blank cellular glass matrices are the averages of two samples of two wavelengths for each dose of gamma radiation. The maximum transmittance of any of the original glass is about 60 percent at 600 mu in the table of the Change in Absorbency With Dose of Glass Matrices:

| Dose, ergs per gram | Absorbency at indicated wavelength | |
|---|---|---|
| | 500 mu | 600 mu |
| 0 | 0.38 | 0.22 |
| $8 \times 10^7$ | 0.38 | 0.22 |
| $5 \times 10^8$ | 0.38 | 0.22 |
| $1 \times 10^9$ | 0.38 | 0.22 |
| $5 \times 10^9$ | 0.41 | 0.25 |
| $9 \times 10^9$ | 0.44 | 0.27 |
| $3 \times 10^{10}$ | 0.44 | 0.30 | with the dose rate $2.8 \times 10^7$ ergs per gram per hour from a 1500 curie cobalt 60 source. The maximum absorption is the product of hours times the rate and is expressed as ergs per gram.

The disclosed matrix and the method of measuring ionizing radiation that are presented hereby are illustrative of this invention and limited modifications and changes may be made therein without departing from the spirit and scope of the invention.

I claim:
1. A radiation dosimeter comprising a cellular silica matrix containing voids and interconnected channels up to about 28 percent of its total volume, and a radiation sensitive dye dispersed within the voids and channels of the matrix.

2. An irradiatable dosimeter for colorimetrically indicating radiant energy and comprising a cellular glass matrix of a density of about 1.45 and a developed surface area in the order of about 200 square meters per gram, and a radiation sensitive dye adsorbed on the surface of the matrix.

3. A dosimeter comprising a cellular glass matrix, and a dye degraded by X-ray and gamma ray energy adsorbed to the surface of the matrix and selected from the group of dyes that consists of methylene blue, basic fuchsine, fluorescein, rhodamine B, fast red S and brilliant green.

4. The dosimeter defined in the above claim 3 wherein the dye methylene blue has the empirical formula $$C_{16}H_{18}ClN_3S \cdot 3H_2O$$

the dye basic fuchsine has the empirical formula $$C_{20}H_{20}N_3Cl$$

the dye fluorescein has the empirical formula $C_{20}H_{12}O_5$, the dye rhodamine B has the empirical formula $$C_{28}H_{31}ClN_2O_3$$

the dye fast red S has the empirical formula $$C_{20}H_{13}N_2NaO_4$$

and the dye brilliant green has the empiral formula $$C_{27}H_{34}N_2O_4S$$

References Cited in the file of this patent
UNITED STATES PATENTS

| 2,086,745 | Sell | July 13, 1937 |
| 2,800,589 | Levy | July 23, 1957 |

OTHER REFERENCES

Chemical Dosimetry, by Harmer, from Nucleonics, vol. 17, No. 10, October 1959, pp. 72–74.